United States Patent
Fan

(10) Patent No.: US 9,645,933 B2
(45) Date of Patent: May 9, 2017

(54) DYNAMIC CACHE PARTITIONING APPARATUS AND METHOD

(71) Applicant: Advanced Micro Devices Products (China) Co., Ltd., Beijing (CN)

(72) Inventor: Bo Fan, Beijing (CN)

(73) Assignee: AMD PRODUCTS (CHINA) CO., LTD., Beijing (CN)

( * ) Notice: Subject to any disclaimer, the term of this patent is extended or adjusted under 35 U.S.C. 154(b) by 187 days.

(21) Appl. No.: 14/534,353

(22) Filed: Nov. 6, 2014

(65) Prior Publication Data
US 2016/0055086 A1    Feb. 25, 2016

(30) Foreign Application Priority Data

Aug. 19, 2014 (CN) .......................... 2014 1 0409443

(51) Int. Cl.
*G06F 12/08* (2016.01)
*G06F 12/0846* (2016.01)
*G06F 12/084* (2016.01)

(52) U.S. Cl.
CPC ........ *G06F 12/0848* (2013.01); *G06F 12/084* (2013.01); *G06F 2212/282* (2013.01)

(58) Field of Classification Search
CPC ............... G06F 12/0848; G06F 12/084; G06F 2212/282
See application file for complete search history.

(56) References Cited

U.S. PATENT DOCUMENTS

| 5,113,507 | A | * | 5/1992 | Jaeckel | ................ | G06N 99/005 |
| | | | | | | 711/5 |
| 5,875,464 | A | * | 2/1999 | Kirk | .................... | G06F 12/1054 |
| | | | | | | 711/121 |
| 2006/0112228 | A1 | * | 5/2006 | Shen | ...................... | G06F 12/084 |
| | | | | | | 711/133 |
| 2007/0143546 | A1 | * | 6/2007 | Narad | ................... | G06F 12/084 |
| | | | | | | 711/130 |

(Continued)

FOREIGN PATENT DOCUMENTS

WO     WO 0227497 A2 *  4/2002  .......... G06F 12/0811

OTHER PUBLICATIONS

Islam Mohamed Hatem AbdulFattah Atta, "Dynamically Partitioned Hybrid Last Level Cache for Chip Multi-Processors", Jun. 2010, Faculty of Engineering, Cairo University.*

Primary Examiner — Rocio Del Mar Perez-Velez
(74) Attorney, Agent, or Firm — Volpe and Koenig, P.C.

(57) ABSTRACT

A dynamic cache partitioning apparatus and method is described, which may be used in a multi-core system having a plurality of cores. The apparatus includes at least one multi-core processor and at least one shared cache shared by a plurality of processing cores, the shared cache including a plurality of cache lines and being partitioned into a plurality of sub-caches including at least one private sub-cache for each single processing core and at least one public sub-cache being shared by all of the processing cores; means for detecting shared cache hit information for each respective processing core of the plurality of processing cores; and means for determining whether a cache line should be allocated to public sub-cache or to a private sub-cache associated with one of the plurality of processing cores.

14 Claims, 4 Drawing Sheets

(56) References Cited

U.S. PATENT DOCUMENTS

| | | | | |
|---|---|---|---|---|
| 2008/0022049 A1* | 1/2008 | Hughes | ................ | G06F 12/084 711/130 |
| 2015/0370707 A1* | 12/2015 | Patsilaras | ............ | G06F 12/0811 711/121 |

* cited by examiner

DYNAMIC CACHE PARTITIONING APPARATUS AND METHOD

CROSS REFERENCE TO RELATED APPLICATION

This application claims priority to Chinese Patent Application No. 201410409443.6, filed Aug. 19, 2014, the entire contents of which is hereby incorporated by reference as if fully set forth herein.

TECHNICAL FIELD

The present invention relates to integrated circuit technology, and more particularly to cache partitioning and control in processors.

BACKGROUND

Memory cache systems are commonly used by the processors of a computer to reduce memory access time, and thus enhance a computer's speed and performance. In general, a memory cache is a smaller, faster memory that stores temporary copies of data from main memory which is likely to be used soon by a processor. When a processor needs to read or write data from a location in main memory, it first checks whether a copy of that data is in the cache. If the data is in the cache (a cache hit), it may be read from or written to much faster than reading from or writing to main memory.

Meanwhile, as integrated circuit technology has advanced, more circuitry can be implemented on a single integrated circuit die, thus allowing for more functionality on integrated circuits. For example, integrated circuits comprising processors having multiple cores are now the norm. Many processors also use multi-level cache, with smaller, faster caches (level 1 (L1) cache) backed up by larger, slower, "higher level" caches (e.g., level 2 (L2) cache, level 3 (L3) cache, etc.). Commonly, for processors having multiple cores, separate cores have individual L1 caches, and share higher level caches.

FIG. 1 schematically shows such a cache hierarchy, in which there is a plurality of cores and each core has a private L1 cache that is locally private to the core. L2 cache is globally shared among the plurality of cores. Both L1 cache and L2 cache are on chip.

SUMMARY

With the development of multiple core processors, the number of cores simultaneously sharing a shared cache increases, which can result in an increase in the number of inter-process conflict misses within the shared cache and hence reduce the overall system performance. For example, the architecture shown in FIG. 1 is most efficient with fewer cores, e.g., less than 8 cores. However, with a higher number of cores, it is very hard or impossible to design such a large volume L2 cache globally shared by all the cores. Moreover, even if such L2 cache can be designed, it is also hard to promise that this global shared L2 cache can provide uniform access latency for each core due to the different physical location. Moreover, besides the capacity and different access latency issues, such a big L2 cache cannot be managed efficiently and thus will reduce the overall system performance.

It has been suggested to partition a shared cache such as L2 between concurrently executing processes. For example, FIG. 2 shows a prior art cache partitioning method that divides an L2 cache 200 into a plurality of static sub-caches (in the embodiment of FIG. 2, the L2 cache is divided into three sub-caches 210, 220, and 230) and assigns each of these sub-caches to a single core of a processor respectively to make it become a private sub-cache to a single core. However, this cache partitioning method has drawbacks in that it will lead to underutilized portions of the cache when set accesses are non-uniform.

To overcome these and other drawbacks, aspects of the present invention provide a dynamic cache partitioning apparatus and method.

In an example embodiment embodying a first aspect, an apparatus comprising a dynamic cache partitioning system is provided. The apparatus includes at least one multi-core processor and at least one shared cache shared by a plurality of processing cores, the shared cache comprising a plurality of cache lines and being partitioned into a plurality of sub-caches including at least one private sub-cache for each single processing core, and at least one public sub-cache being shared by all of the processing cores; means for detecting shared cache hit information for each respective processing core of the plurality of processing cores; and means for determining whether a cache line should be allocated to public sub-cache or to a private sub-cache associated with one of the plurality of processing cores.

In an example embodiment embodying a second aspect, a dynamic cache partitioning method for a multi-core system is provided. The method includes detecting access to a shared cache by each of a plurality of processing cores, determining whether a cache line should be allocated to a public sub-cache in the shared cache shared by all processing cores, or to a private sub-cache associated with one of the plurality of processing cores, and allocating the cache line to the public sub-cache or private sub-cache in the shared cache.

In an example embodiment embodying a third aspect, an integrated circuit is provided, the integrated circuit including at least one processor including a plurality of processing cores, the at least one processor further including at least one shared cache shared by the plurality of processing cores, the shared cache including a plurality of cache lines and being partitioned into a plurality of sub-caches including at least one private sub-cache for each single processing core, and at least one public sub-cache being shared by all of the processing cores; a plurality of monitoring circuits corresponding to the plurality of cores, each monitoring circuit coupled with one of the plurality of cores respectively, each monitoring circuit being configured to detect shared cache hit information for its respective core of the plurality of cores; and a partitioning logic circuit coupled with the plurality of monitoring circuits and the shared cache, the partitioning logic circuit being configured to determine whether a cache line should be allocated to public sub-cache or to a private sub-cache associated with one of the plurality of processing cores.

Other aspects and embodiments are described herein below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth to provide a thorough understanding of the present invention. It will be apparent, however, to one skilled in the art, that the present invention may be practiced without some or all of these specific details. In other instances, well known process steps and/or structures are not described in detail to not unnecessarily obscure the present invention.

In an aspect of the present invention, an apparatus including a dynamic cache partitioning system and a method of dynamic cache partitioning oriented to a multi-core system are proposed. The apparatus and method provide for dynamic partition between shared and private sub-caches of a shared cache. In this way, the sub-caches in the shared cache are not static but can be dynamically adjusted according to the hit information of each processing core of the multi-core system so that the cache can be used for both "private" and "shared" data set among many cores. The private sub-caches of the shared cache are mainly used by private data and the shared sub-cache is mainly used by shared data. Thus, the apparatus and the dynamic cache partitioning method can improve data sharing performance and simplify the data coherency in a multi-core system and the cache can be best used efficiently. Even if accesses to the sub-caches of the cache are non-uniform, there will not be underutilized portions of the shared cache.

Figure 1:
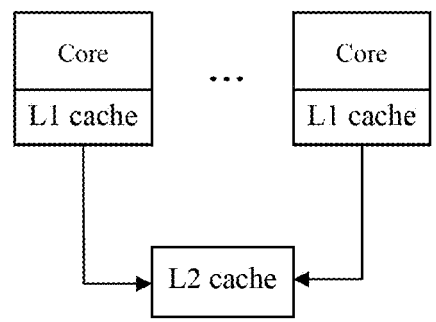
FIG. 1 shows a schematic diagram of a conventional cache architecture.
Figure 2:
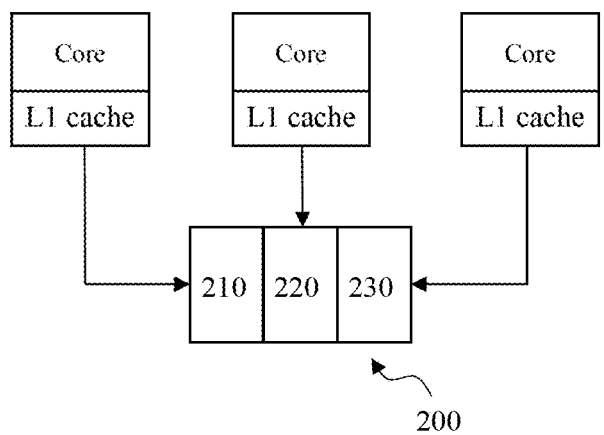
FIG. 2 is a schematic figure showing a conventional cache partitioning system.
Figure 3:
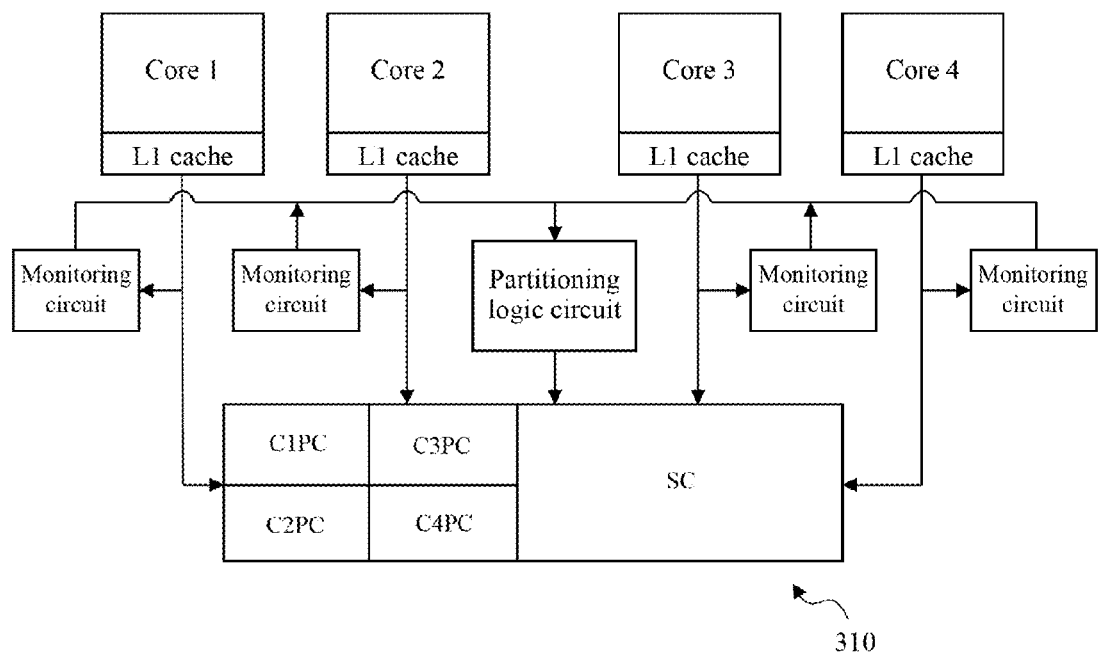
FIG. 3 shows an apparatus including a dynamic cache partitioning system according to one explanatory embodiment.

FIG. 3 shows a schematic diagram for an exemplary embodiment of the apparatus including a dynamic partitioning system according to an aspect of the present invention. As shown in the embodiment of FIG. 3, the apparatus includes a processor having four processing cores, though it should be understood that the number of cores is not limited, and the invention is applicable to any apparatus having two or more cores.

In FIG. 3, each of the four cores, namely core 1, core 2, core 3, and core 4, has a private L1 cache. Each core is further coupled to a common shared L2 cache 310. The L2 cache 310 can be divided into five sub-caches, including four private sub-caches associated with a respective one of the processing cores, namely C1PC, C2PC, C3PC, and C4PC, and one public shared sub-cache SC shared by all processing cores. Here, the four private sub-caches and the shared sub-cache are not static but can be dynamically adjusted as will be described in the following. As shown in FIG. 3, the apparatus also includes a plurality of monitoring circuits, each of the monitoring circuits being coupled with a corresponding core. Each monitoring circuit is used to gain cache line hit information for the coupled core's access to the L2 cache 310. A partitioning logic circuit is further coupled with each monitoring circuit and the L2 cache 310.

Figure 4:
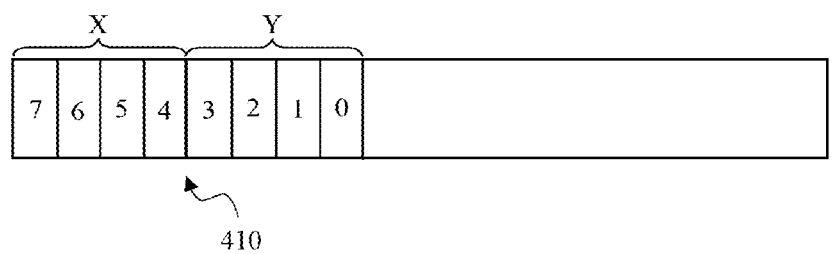
FIG. 4 is a schematic diagram of a cache line according to one explanatory embodiment.

The L2 cache 310 includes a plurality of cache lines. Each cache line is configured to include a coordinate based counter 410 for indicating the status of the cache line. FIG. 4 shows an example of one cache line having a coordinate based counter 410. In the embodiment of FIG. 4, the coordinate value (X, Y) of the counter is indicated by 8 bits, namely bit 7, bit 6 . . . bit 2, bit 1, and bit 0, wherein X is bit 7, bit 6, bit 5, and bit 4, and Y is bit 3, bit 2, bit 1, and bit 0. For X, bit 7 is a sign bit, 1 means positive and 0 means negative. Y is indicated in the same way. Thus, the maximum value of X is 7 in decimal and the minimum value of X is −7 in decimal. Y is used the same as X. Of course, it should be understood that another number of bits can be used to indicate the coordinate value of the counter.

Using the coordinate based counter 410, historical cache information for each cache line can be monitored, recorded, and modified. For example, the coordinate value of the counter can be modified based on hit information, and thus the status of the cache line can be indicated and adjusted, and accordingly allocated to one of the sub-caches of the L2 cache 310 by a partitioning logic, and the L2 cache can be dynamically partitioned.

Figure 5:
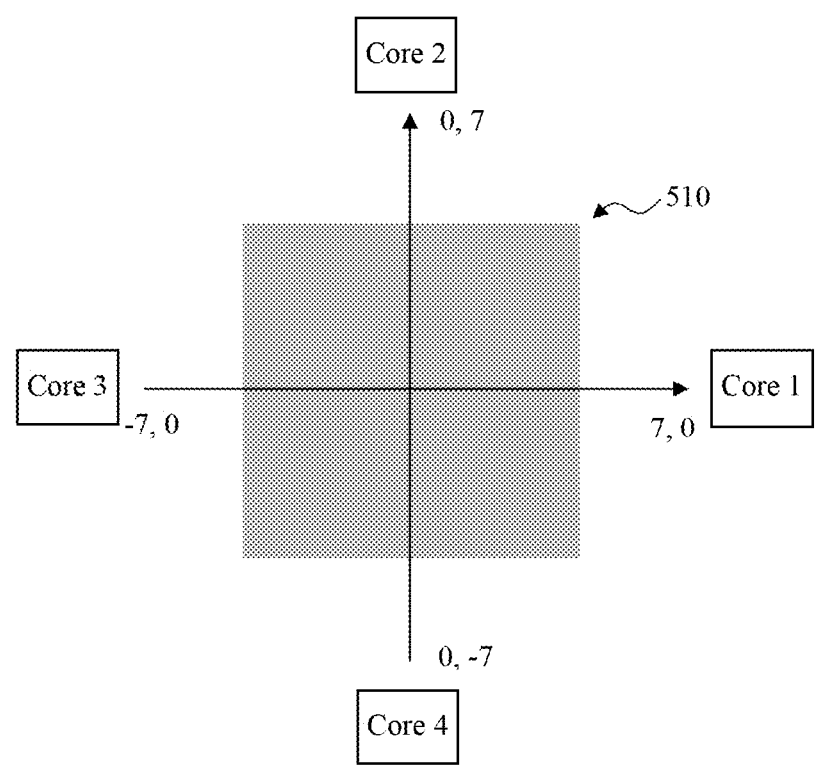
FIG. 5 is a schematic diagram of a dynamic cache status according to one explanatory embodiment.
Figure 6:
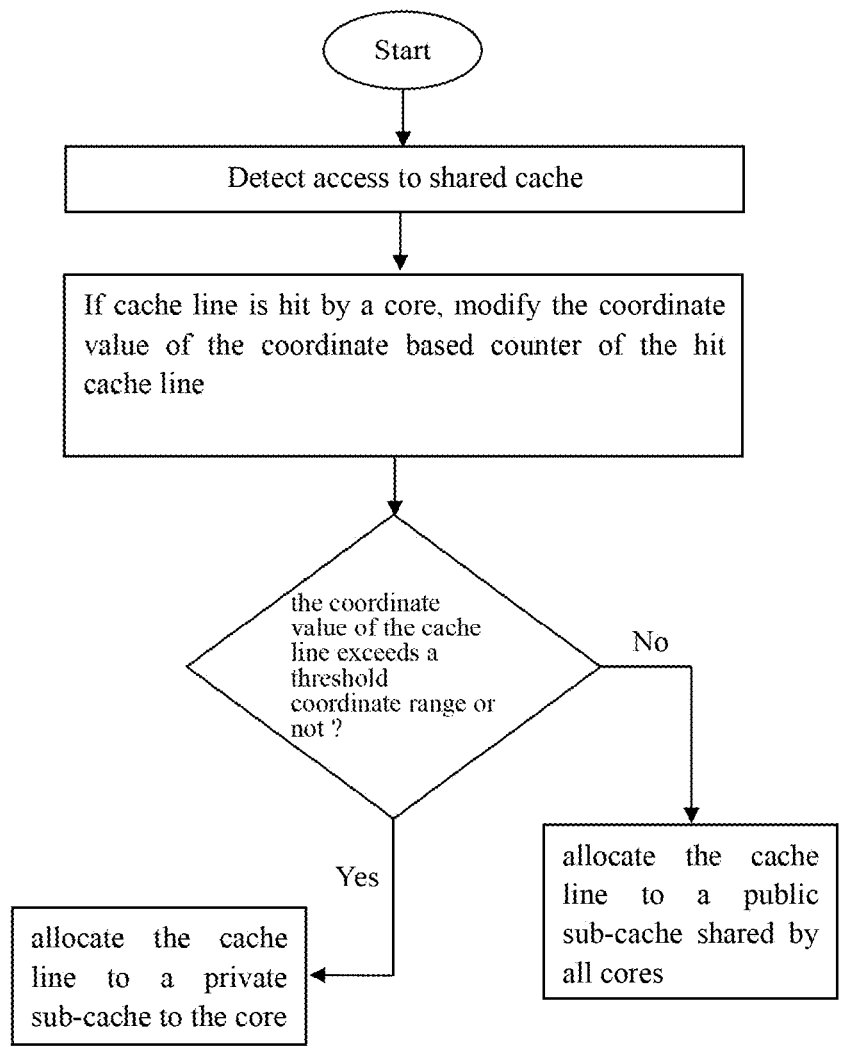
FIG. 6 is a flow chart describing a dynamic cache partitioning method according to an explanatory embodiment.

An embodiment of a dynamic cache partitioning method is shown with reference to FIGS. 5 and 6. FIG. 5 shows a dynamic cache status. As shown in FIG. 5, a threshold coordinate range may be designated for a public sub-cache to be shared by all cores of a multicore processor. When the coordinate value of the counter of a cache line lies in the threshold coordinate range indicated by shaded area 510, the cache line is allocated to the public sub-cache that is shared by all cores. When the coordinate value of the counter of a cache line lies out of the threshold coordinate range indicated by the shaded area 510, the cache line is allocated to a private sub-cache associated with a single core. For example, in the embodiment of FIG. 5, the coordinates X and Y are indicated with four bits respectively, and the limit coordinate value indicating a cache line is private to core 1 is (7, 0). Likewise, the limit coordinate value indicating a cache line is private to cores 2, 3, and 4 is (0, 7), (−7, 0), and (0, −7) respectively. The threshold coordinate range for each core could be set to be its limit coordinate value, or another threshold value could be used.

FIG. 6 is an example flow chart of a method of dynamic cache partitioning according to the present invention. The method may be performed by the monitoring circuit and partitioning logic circuit as shown in FIG. 3. As shown in FIG. 6, each cache line access to the shared cache L2 is monitored to gain the hit information for each core. The monitoring can be performed by monitoring circuits as depicted in FIG. 3. Each cache line includes a coordinate based counter. If a cache line is hit by a core, the coordinate value of the counter of the hit cache line is modified. Thereafter, it is determined whether the coordinate value of the cache line exceeds a threshold coordinate range or not. If the coordinate value exceeds the threshold coordinate range, the cache line is allocated to a private sub-cache to the core. If the coordinate value does not exceed the threshold coordinate range, the cache line is allocated to a public sub-cache in the shared cache. The modification of the coordinate based counter of a cache line and allocation to a private or public sub-cache in the shared cache can be performed by partitioning logic as depicted in FIG. 3.

Before a first access, the ownership of a cache line is undefined, so the first access may be used to define ownership. For example, if a cache line is loaded by core 1 at first, the initial counter is (7, 0). In the same way, if a cache line is loaded by core 2 at first, the initial counter is (0, 7), core 3 is (−7, 0), and core 4 is (0, −7).

After the first access, the coordinate value may be further modified. For example, if a current coordinate value of a counter of a cache line is (4, −3), when the cache line is hit by core 1, the coordinate value of the cache line may be modified to be closer to the limit coordinate value of core 1, (7, 0), e.g., if there is a core 1 access, the X value of counter should add 1, and the Y value will also add 1. Thus, the coordinate will be (5, −2). In this way, the counter will be closer to the limit coordinate value of core 1, (7, 0). Thereafter, it is determined whether the coordinate value of the counter of the cache line exceeds or lies in a threshold coordinate range; if the coordinate value of the counter of the cache line exceeds the threshold coordinate range in response to a hit by a core, the cache line is allocated to a sub-cache private to the core; and if the coordinate value of the cache line still lies in the threshold coordinate range, the cache line is allocated to a public sub-cache that shared by all cores. The determination and allocation can be performed, e.g., by a partitioning logic circuit depicted in FIG. 3. It should be noted that the threshold coordinate range can be set according to any specific requirements.

In an embodiment, the sub-caches of shared cache may be managed. For example, if a core of the multi-core system records a cache miss, the object data is copied from main memory, and a least recently used algorithm (LRU algorithm) may be used to determine the least recently used one of the private cache lines for the core, and the data in the least recently used one of the private cache lines may be replaced with the object data. If a least recently used one of the private cache lines is not found, the least recently used cache line allocated to the public shared sub-cache may be found and replaced with the object data and the coordinate value of the cache line may be set to the limit coordinate value corresponding to the core to make the shared cache line private to the core.

In one embodiment, the number of private cache lines for each core of the multi-core system can be constrained. If the number of private cache lines for one core reaches a maximum, where there is any new cache line miss of the core, the data in the least recently used cache line in the core's private sub-cache may be replaced with the object data fetched from a main memory. If the number of private cache lines for a core reaches a minimum, where there is any new cache line miss of the core, no replacement is necessary. The same applies to the shared cache lines.

Although features and elements are described above in particular combinations, each feature or element can be used alone without the other features and elements or in various combinations with or without other features and elements. The methods or flow charts provided herein may be implemented in a computer program, software, or firmware incorporated in a non-transitory computer-readable storage medium for execution by a general purpose computer or a processor. Examples of non-transitory computer-readable media include, but are not limited to, magnetic media such as hard disks, floppy disks, and magnetic tape, optical media such as CD-ROMs and holographic devices, magneto-optical media such floptical disks, and hardware devices that are specially configured to store and execute program code, such as application-specific integrated circuits (ASICs), programmable logic devices and ROM and RAM devices. The computer-readable codes can be executed by one or more processing units such as a graphics processing unit.

The apparatus and the dynamic cache partitioning method in accordance with the present invention are independent of the physical latency character and can be applied to both UMA (Uniform Memory Access) and NUMA (Non Uniform Memory Access) cache architecture. As described above, a processor may include two or more cores, for example, four core pairs (i.e., 8 cores). The shared cache may be of any capacity, and may be partitioned into sub-caches of any capacity. Although the above embodiments are described with respect to an L2 cache and compute units within a processor, the methods described above may apply to any type of shared cache, for example, L3 cache, and any compute unit. Suitable processors may include, by way of example, a general purpose processor, a special purpose processor, a conventional processor, a digital signal processor, a plurality of microprocessors, one or more processors in association with a digital signal processor core, a controller, a microcontroller, Application Specific Integrated Circuits (ASICs), Field Programmable Gate Arrays, any other type of integrated circuit, and/or a state machine.

It will be apparent to those skilled in the art the embodiments described above is only illustrative and cannot be deemed as a limitation to present invention, and that various modifications and variations can be made to the embodiments described herein without departing from the scope of the claimed subject matter. Thus, it is intended that the specification covers modifications and variations of the various embodiments described herein, provided such modification and variations come within the scope of the appended claims and their equivalents.

What is claimed is:

1. An apparatus, comprising:
a processor including a plurality of processing cores;
a shared cache comprising a plurality of cache lines accessible by each of the plurality of processing cores and being partitioned into a plurality of sub-caches including (i) a plurality of private sub-caches each comprising a number of private cache lines accessible by a single processing core and (ii) a public sub-cache comprising a number of public cache lines accessible by each of the plurality of processing cores, each cache line of the plurality of cache lines includes a coordinate-based counter indicating a status of each corresponding cache line;
a plurality of monitoring circuits, each monitoring circuit configured to detect shared cache hit information for each processing core of the plurality of processing cores; and
a partitioning logic circuit configured to modify a coordinate value of the coordinate-based counter and adjust the number of public cache lines accessible by each of the plurality of processing cores when a cache line of the plurality of cache lines is hit by a corresponding single processing core by determining, based on a threshold range and the modified coordinate value of the coordinate-based counter, whether to allocate the cache line to the public sub-cache or to one of the private sub-caches accessible by the corresponding single processing core.

2. The apparatus of claim 1, wherein the threshold range is a threshold coordinate range and the partitioning logic circuit is further configured to:
modify the coordinate value of the coordinate-based counter of the hit cache line to be closer to a limit coordinate value indicating that the cache line is private to the corresponding single processing core recording the cache hit;

determine whether the coordinate value of the coordinate-based counter of the cache line exceeds or lies in the threshold coordinate range;

if the coordinate value of the coordinate-based counter of the cache line exceeds the threshold coordinate range, allocate the cache line to a private sub-cache accessible by the corresponding single processing core recording the hit; and if the coordinate value of the cache line lies in the threshold coordinate range, allocate the cache line to the public sub-cache comprising the number of public cache lines accessible by each of the plurality of processing cores.

3. The apparatus of claim 2, wherein the partitioning logic circuit is further configured to:

determine that the hit to the cache line is a first access to the cache line and modify the coordinate value of the coordinate-based counter of the cache line to be the limit coordinate value corresponding to the corresponding single processing core recording the hit; and allocate the cache line to a private sub-cache accessible by the corresponding single processing core recording the hit.

4. The apparatus of claim 1, wherein the partitioning logic circuit is further configured to: define a maximum number of private cache lines for each private sub-cache; and manage the plurality of sub-caches of the shared cache according to a least recently used algorithm.

5. The apparatus of claim 1, wherein the shared cache is an L2 or an L3 cache.

6. A dynamic cache partitioning method for a multi-core system, comprising:

detecting access to a shared cache by each of a plurality of processing cores, the shared cache comprising a plurality of cache lines accessible by each of the plurality of processing cores and being partitioned into a plurality of sub-caches including (i) a plurality of private sub-caches each comprising a number of private cache lines accessible by a single processing core and (ii) a public sub-cache comprising a number of public cache lines accessible by each of the plurality of processing cores, each cache line of the plurality of cache lines includes a coordinate-based counter indicating a status of each corresponding cache line;

detecting shared cache hit information for each processing core of the plurality of processing cores; and modifying a coordinate value of the coordinate-based counter and adjusting the number of public cache lines accessible by each of the plurality of processing cores when a cache line of the plurality of cache lines is hit by a corresponding single processing core by determining, based on a threshold range and the modified coordinate value of the coordinate-based counter, whether to allocate the cache line to the public sub-cache or to one of the private sub-caches accessible by the corresponding single processing core.

7. The dynamic cache partitioning method of claim 6, further comprising: detecting which of the plurality of processing cores hits the cache line and modifying the coordinate value of a coordinate-based counter included in the cache line hit to be closer to a limit coordinate value indicating that the cache line is private to the detected processing core;

determining whether the coordinate value of the coordinate-based counter of the cache line exceeds the threshold range;

allocating the cache line to a private sub-cache to the detected processing core if the coordinate value exceeds the threshold range; and allocating the cache line to the public sub-cache comprising the number of public cache lines accessible by each processing core if the coordinate value does not exceed the threshold range.

8. The dynamic cache partitioning method of claim 7, further comprising:

detecting that the hit to the cache line is a first access to the cache line, and setting the coordinate value of the coordinate-based counter of the cache line to be the limit coordinate value of the detected processing core recording the first access to the cache line; and allocating the cache line to a private sub-cache accessible by the detected processing core recording the first access.

9. The dynamic cache partitioning method of claim 6, further comprising: managing the plurality of sub-caches of the shared cache, wherein if a processing core of the multi-core system records a cache miss: copying object data from a main memory; determining a least recently used line of the private cache lines for the processing core that records the cache miss; and replacing data in the least recently used line of the private cache lines with object data.

10. The dynamic cache partitioning method of claim 9, wherein if the least recently used line of the private cache lines is not found: determining a least recently used cache line allocated to the public sub-cache;

replacing data in the least recently used cache line allocated to the public sub-cache with the object data; and setting the coordinate value of the coordinate-based counter of the least recently used cache line allocated to the public sub-cache to the limit coordinate value corresponding to the processing core that records the cache miss.

11. The dynamic cache partitioning method of claim 10, further comprising:

defining a maximum for the number of the private cache lines of each processing core of the multi-core system, and if the number of private cache lines of one of the processing cores reaches the maximum and there is any new cache miss of the one processing core, replacing the data in the oldest cache line of the private cache lines of the one processing core with the object data fetched from the main memory of the multi-core system.

12. An integrated circuit, comprising:

a processor comprising:

a plurality of processing cores; and a shared cache comprising a plurality of cache lines accessible by each of the plurality of processing cores and being partitioned into a plurality of sub-caches including (i) a plurality of private sub-caches each comprising a number of private cache lines accessible by a single processing core and (ii) a public sub-cache comprising a number of public cache lines accessible by each of the plurality of processing cores, each cache line of the plurality of cache lines includes a coordinate-based counter indicating a status of each corresponding cache line;

a plurality of monitoring circuits, each monitoring circuit coupled to one processing core of the plurality of processing cores, each monitoring circuit configured to detect shared cache hit information for the one processing core of the plurality of processing cores; and a partitioning logic circuit coupled with the plurality of monitoring circuits and the shared cache, the partitioning logic circuit configured to modify a coordinate value of the coordinate-based counter and adjust the number of public cache lines accessible by each of the plurality of processing cores when a cache line of the plurality of cache lines is hit by a corresponding single processing core by determining, based on a threshold range and the modified coordinate value of the coordinate-based counter, whether to allocate the cache line to the public sub-cache or to one of the private sub-caches accessible by the corresponding single processing core.

13. The integrated circuit according to claim 12, wherein the threshold range is a threshold coordinate range and the partitioning logic circuit is further configured to:
modify the coordinate value of the coordinate-based counter of the hit cache line to be closer to a limit coordinate value indicating the cache line is private to the corresponding single processing core recording the hit to the cache line; determine whether the coordinate value of the coordinate-based counter of the cache line exceeds or lies in a threshold coordinate range; allocate the cache line to a sub-cache private to the processing core recording the hit if the coordinate value of the coordinate-based counter of the cache line exceeds the threshold coordinate range; and allocate the cache line to a public sub-cache comprising the number of public cache lines accessible by each processing core if the coordinate value of the cache line lies in the threshold coordinate range.

14. The integrated circuit of claim 13, wherein the partitioning logic circuit is further configured to:
determine that the hit to the cache line is a first access to the cache line and modify the coordinate value of the coordinate based counter of the cache line to be the limit coordinate value corresponding to the corresponding single processing core recording the hit; and
allocate the cache line to a private sub-cache accessible by the corresponding single processing core recording the hit.

* * * * *